(12) United States Patent
He et al.

(10) Patent No.: US 9,762,375 B2
(45) Date of Patent: *Sep. 12, 2017

(54) SELECTION OF ACKNOWLEDGMENT TIMING IN WIRELESS COMMUNICATIONS

(71) Applicant: Intel Corporation, Santa Clara, CA (US)

(72) Inventors: Hong He, Beijing (CN); Jong-Kae Fwu, Sunnyvale, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/385,361

(22) Filed: Dec. 20, 2016

(65) Prior Publication Data

US 2017/0104575 A1 Apr. 13, 2017

Related U.S. Application Data

(63) Continuation of application No. 14/970,035, filed on Dec. 15, 2015, now Pat. No. 9,614,709, which is a
(Continued)

(51) Int. Cl.
*H04J 3/00* (2006.01)
*H04L 5/14* (2006.01)
(Continued)

(52) U.S. Cl.
CPC .............. *H04L 5/14* (2013.01); *H04L 1/1812* (2013.01); *H04L 5/0055* (2013.01);
(Continued)

(58) Field of Classification Search
CPC ....................................................... H04L 5/14
(Continued)

(56) References Cited

U.S. PATENT DOCUMENTS

2010/0080152 A1 4/2010 Lindh et al.
2010/0333135 A1 12/2010 Lau et al.
(Continued)

FOREIGN PATENT DOCUMENTS

CN 101594211 A 12/2009
CN 102075949 A 5/2011
(Continued)

OTHER PUBLICATIONS

Office Action issued Jan. 25, 2017 from Mexican Divisional Application No. MX/a/2016/001743, 4 pages.
(Continued)

*Primary Examiner* — Afshawn Towfighi
(74) *Attorney, Agent, or Firm* — Schwabe, Williamson & Wyatt, P.C.

(57) ABSTRACT

Disclosed is a method including communicating, by a mobile device, with a base station via first and second component carriers having different frequency bands and time division duplexing (TDD) configurations. The method may include receiving one or more downlink transmissions via the second component carrier. The method may include selecting a hybrid automatic repeat request (HARQ) timing sequence based on the TDD configurations of the first and second component carriers. The method may include transmitting one or more positive acknowledgment and/or negative acknowledgement (ACK/NACK) signals, associated with the one or more downlink transmissions, according to the selected HARQ timing sequence. Other embodiments may be described and claimed.

20 Claims, 11 Drawing Sheets

Related U.S. Application Data continuation of application No. 14/247,189, filed on Apr. 7, 2014, now Pat. No. 9,247,527, which is a continuation of application No. 13/997,971, filed as application No. PCT/US2012/031040 on Mar. 28, 2012, now Pat. No. 9,220,085.

(60) Provisional application No. 61/556,109, filed on Nov. 4, 2011.

(51) Int. Cl.
*H04L 1/18* (2006.01)
*H04L 5/00* (2006.01)
*H04W 72/04* (2009.01)

(52) U.S. Cl.
CPC ..... *H04W 72/042* (2013.01); *H04W 72/0413* (2013.01); *H04W 72/0446* (2013.01)

(58) Field of Classification Search
USPC .......................................................... 370/280
See application file for complete search history.

(56) References Cited

U.S. PATENT DOCUMENTS

| | | | |
|---|---|---|---|
| 2011/0176461 A1 | 7/2011 | Astely et al. | |
| 2011/0243039 A1 | 10/2011 | Papasakellariou et al. | |
| 2012/0327821 A1* | 12/2012 | Lin | H04W 72/048 370/280 |

FOREIGN PATENT DOCUMENTS

| | | |
|---|---|---|
| CN | 102084704 A | 6/2011 |
| CN | 102142941 A | 8/2011 |
| RU | 242619 C2 | 7/2011 |
| WO | 2011/127100 A1 | 10/2011 |

OTHER PUBLICATIONS

Office Action issued Mar. 10, 2017 from Korean Divisional Application No. 2017-7005298, 9 pages.
Office Action issued Feb. 3, 2017 from Russian Divisional Application No. 2016117322, 8 pages.
International Search Report and Written Opinion mailed Oct. 30, 2012 from International Application No. PCT/US2012/031040.
Notification Concerning Transmittal of International Preliminary Report on Patentability mailed on May 15, 2014 from International Application No. PCT/US2012/031040.
Search Report issued Jul. 8, 2014 from Dutch Application No. 2009759.
Office Action issued Feb. 6, 2015 from Mexican Application No. MX/a/2014/005392.
Office Action issued Mar. 2, 2015 from Australian Application No. 2012333172.
Office Action issued Mar. 24, 2015 from Swedish Patent Application No. 1350889-0.
Search Report issued Mar. 25, 2015 from European Application No. 12845404.8.
Office Action issued Apr. 16, 2015 from Finnish Patent Application No. 20126147.
Office Action mailed May 26, 2015 for Japanese Application No. 2014-539922.
Office Action mailed Jun. 5, 2015 for Mexican Application No. MX/a/2014/005392.
Office Action mailed Jul. 8, 2015 for Canadian Application No. 2853239.
Office Action mailed Sep. 11, 2015 for Russian Application No. 2014117684.
Office Action mailed Oct. 21, 2015 for Korean Application No. 2014-7012117.
Office Action mailed Oct. 20, 2015 for Japanese Application No. 2014-539922.
Office Action mailed May 24, 2016 from Japanese Application No. 2014-539922, 11 pages.
Office Action issued Jun. 7, 2016 from Swedish Patent Application No. 1350889-0, 15 pages.
Office Action issued Aug. 9, 2016 from Chinese Patent Application No. 201280054286.0.
Office Action issued Jul. 27, 2016 from Korean Patent Application No. 2014-7012117, 5 pages.
Office Action issued Oct. 8, 2016 from Australian Divisional Patent Application No. 2016200154, 2 pages.
Catt, "Design of TDD Inter-band Carrier Aggregation," 3GPP TSG RAN WG1 Meeting #66bis, R1-112944, Oct. 10-14, 2011, Zhuhai, China, See fig. 5 and pp. 3-4.
Alcatel-Lucent, "Report of email discussion on Need," 3GPP TSG-RAN WG2#64, R2-086541, Nov. 10-14, 2008, Prague, Czech Republic, See pp. 1-2.
3GPP, "Evolved Universal Terrestrial Radio Access (E-UTRA); Physical layer procedures (Release 10)," 3GPP TS 36.213 V10.3.0 (Sep. 2011), Sep. 27, 2011, Lte Advanced, pp. 122 pages.
3GPP, "Evolved Universal Terrestrial Radio Access (E-UTRA); Physical Channels and Modulation (Release 10)," 3GPP TS 36.211 V10.3.0 (Sep. 2011), Sep. 27, 2011, Lte Advanced, pp. 103 pages.
Ericsson, et al., "Applicable scenarios for TDD CA of different UL-DL configurations," 3GPP TSG-RAN WG1 #66bis, R1-113532, Agenda Item: 7.2.1.5.1, Oct. 10-14, 2011, Zhuhai, China, 6 pages.
Mediatek Inc., "HARQ Feedback Mechanism in CA with Different TDD Configurations," 3GPP TSG-RAN WG1 Meeting #66BIS, R1-113047, Agenda Item: 7.2.1.5.2, Oct. 10-14, 2011, Zhuhai, China, 5 pages.
Nokia Siemens Networks, et al., "Cell specific TDD configuration with inter-band CA," 3GPP TSG-RAN WG2 Meeting #74, R2-112946, Agenda Item: 7.1.2, May 9-13, 2011, Barcelona, Spain, 4 pages.
Pantech, "Discussion on HARQ timing for inter-band CA with different TDD configuration," 3GPP TSG RAN1 #66bis, R1-113103, Agenda Item: 7.2.1.5.2, Oct. 10-Oct. 14, 2011, Zhuhai, China, 7 pages.
Sharp, "Uplink reporting for inter-band carrier aggregation with different TDD configurations," 3GPP TSG-RAN WG1 066, R1-113345, Agenda Item: 7.2.1.5.1, Oct. 10-14, 2011, Zhuhai, China, 6 pages.
Intel Corporation, "Discussion on HARQ feedback of TDD Inter-band Carrier Aggregation," 3GPP TSG-RAN WG1 #67, R1-113951, Agenda Item: 7.2.1.5, Nov. 14-18, 2011, San Francisco, USA, 8 pages.
Second Office Action issued Apr. 24, 2017 from Chinese Patent Application No. 201280054286.0, 18 pages.

* cited by examiner

PCell TDD configuration

| SCell TDD configuration | 0 | 1 | 2 | 3 | 4 | 5 | 6 |
|---|---|---|---|---|---|---|---|
| 0 | 0 | 1 | 2 | 3 | 4 | 5 | 6 |
| 1 | 1 | 1 | 2 | 4 | 4 | 5 | 1 |
| 2 | 2 | 2 | 2 | 5 | 5 | 5 | 2 |
| 3 | 3 | 4 | 5 | 3 | 4 | 5 | 3 |
| 4 | 4 | 4 | 5 | 4 | 4 | 5 | 4 |
| 5 | 5 | 5 | 5 | 5 | 5 | 5 | 5 |
| 6 | 6 | 1 | 2 | 3 | 4 | 5 | 6 |

Table 2: HARQ timing decision table

Figure 11

SELECTION OF ACKNOWLEDGMENT TIMING IN WIRELESS COMMUNICATIONS

CROSS REFERENCE TO RELATED APPLICATIONS

The present application is a continuation of U.S. patent application Ser. No. 14/970,035, filed Dec. 15, 2015, entitled "SELECTION OF ACKNOWLEDGMENT TIMING IN WIRELESS COMMUNICATIONS," which is a continuation of U.S. patent application Ser. No. 14/247,189, filed Apr. 7, 2014, entitled "SELECTION OF ACKNOWLEDGMENT TIMING IN WIRELESS COMMUNICATIONS," which is a continuation of U.S. patent application Ser. No. 13/997,971, filed Sep. 23, 2013, entitled "SELECTION OF ACKNOWLEDGMENT TIMING IN WIRELESS COMMUNICATIONS," which is a national phase entry under 35 U.S.C. §371 of International Application No. PCT/US2012/031040, filed Mar. 28, 2012, entitled "SELECTION OF ACKNOWLEDGMENT TIMING IN WIRELESS COMMUNICATIONS", which designates the United States of America, and which claims priority to U.S. Provisional Patent Application No. 61/556,109, filed Nov. 4, 2011, entitled "ADVANCED WIRELESS COMMUNICATION SYSTEMS AND TECHNIQUES," the entire contents and disclosures of which are hereby incorporated by reference in their entireties.

FIELD

Embodiments of the present invention relate generally to the field of communications, and more particularly, to selection of acknowledgement timing in wireless communication networks.

BACKGROUND INFORMATION

A time division duplex (TDD) system, in wireless communications, may offer flexibility in resource utilization. For example, a TDD system may use different TDD configurations to match uplink and downlink traffic characteristics of a wireless communications cell. The flexibility of using different TDD configurations, may permit the ratio between available uplink (UL) and downlink (DL) resources to range from 3 UL:2 DL to 1 UL:9 DL.

Release 10, of $3^{rd}$ Generation Partnership Project's (3GPP) long term evolution-advanced (LTE-A) communications standard, may limit support of the aggregation of TDD Component Carriers (CCs) to the same uplink/downlink (UL/DL) TDD configurations. While such limitations may have simplified the design and operation within the standard, such limitation may have limited potential for greater data throughput.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 11 depicts Table 2, an example HARQ timing decision table, in accordance with various embodiments.

DESCRIPTION OF THE EMBODIMENTS

Illustrative embodiments of the present disclosure include, but are not limited to, methods, systems, and apparatuses for selection of acknowledgement signal timing in a wireless communication network.

Various aspects of the illustrative embodiments will be described using terms commonly employed by those skilled in the art to convey the substance of their work to others skilled in the art. However, it will be apparent to those skilled in the art that some alternate embodiments may be practiced using with portions of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order to not obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present disclosure.

This application is intended to cover any adaptations or variations of the embodiments discussed herein. Therefore, it is manifestly intended that the embodiments of the present disclosure be limited only by the claims and the equivalents thereof.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
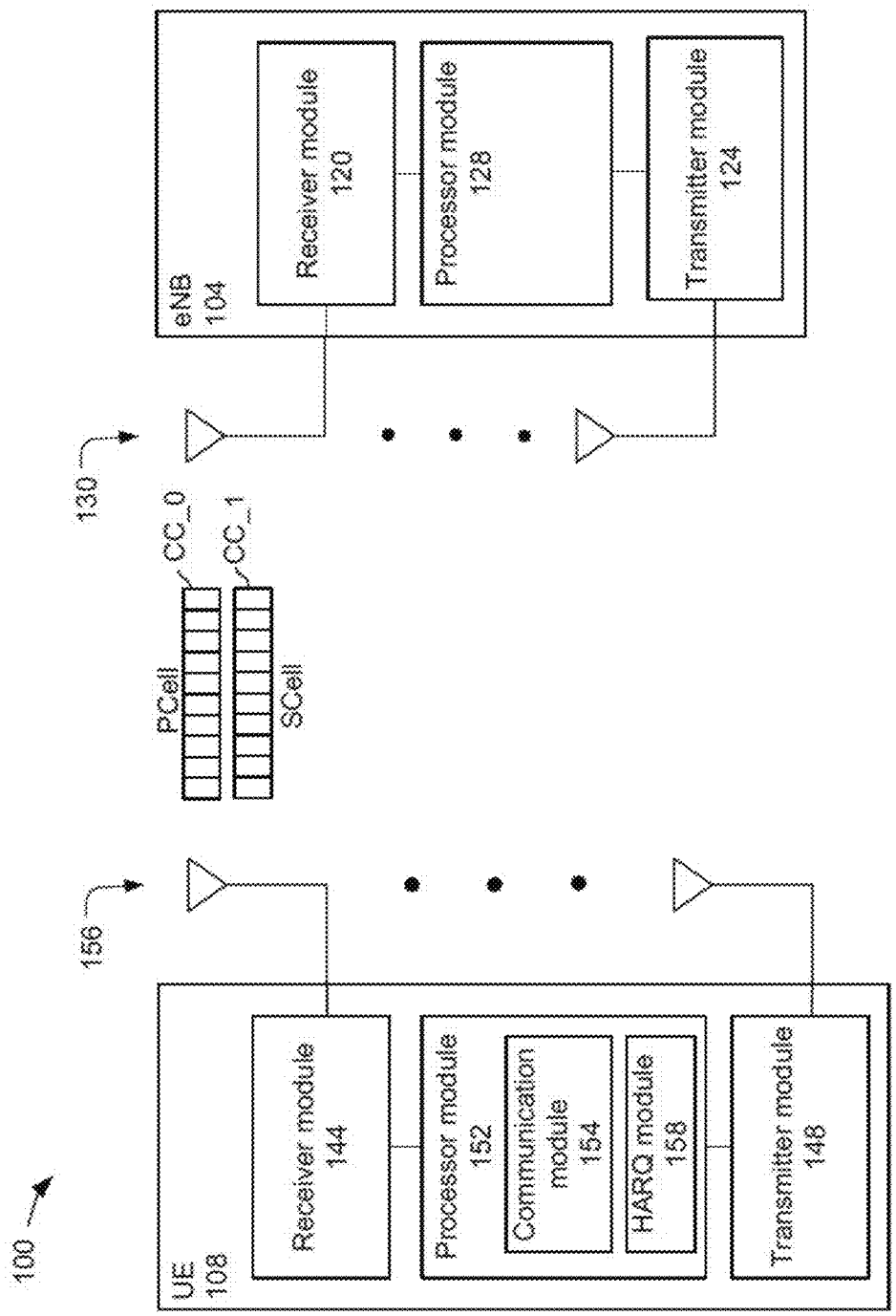
FIG. 1 schematically illustrates a wireless communication network in accordance with various embodiments.

FIG. 1 schematically illustrates a wireless communication network 100 in accordance with various embodiments. Wireless communication network 100 (hereinafter "network 100") may be an access network of a 3rd Generation Partnership Project (3GPP) long-term evolution (LTE) network such as evolved universal mobile telecommunication system (UMTS) terrestrial radio access network (E-UTRAN). The network 100 may include a base station, e.g., enhanced node base station (eNB) 104, configured to wirelessly communicate with a mobile device or terminal, e.g., user equipment (UE) 108. While embodiments of the present invention are described with reference to an LTE network, some embodiments may be used with other types of wireless access networks.

eNB 104 may include a receiver module 120 with which to receive signals from UE 108 via one or more antennas 130. eNB 104 may include a transmitter module 124 with which to transmit signals to UE 108 via one or more antennas 130. eNB 104 may also include a processor module 128 coupled between receiver module 120 and transmitter module 124 and configured to encode and decode information communicated by the signals.

In embodiments in which the UE 108 is capable of utilizing carrier aggregation (CA), a number of component carriers (CCs) may be aggregated for communication between the eNB 104 and the UE 108. In an initial connection establishment, the UE 108 may connect with a primary serving cell (Pcell) of the eNB 104 utilizing a primary CC. This connection may be used for various functions such as security, mobility, configuration, etc. Subsequently, the UE 108 may connect with one or more secondary serving cells (Scells) of the eNB 104 utilizing one or more secondary CCs. These connections may be used to provide additional radio resources.

Each CC may support a number of communication channels according to a release of the 3GPP LTE-advanced communication standard. For example, each CC may support a physical downlink shared channel (PDSCH) for transmission of downlink data. As another example, each CC may support physical uplink control channel (PUCCH) or/and physical uplink shared channel (PUSCH) to carry information between UE 108 and eNB 104. A CC may include a plurality of uplink and downlink subframes for carrying information between eNB 104 and UE 108. A single 10 ms radio frame may include ten subframes.

The CCs may be configured to transport information according to a time domain duplexing (TDD) communication protocol. Each CC may be scheduled to transport data to UE 108 or transport data to eNB 104 according to one of several TDD configurations. For example, with reference to Table 1, each CC may be assigned to transport data

TABLE 1

TDD Uplink-Downlink Configurations

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D | and/or control signals according to one of TDD configurations 0-6. A primary CC and secondary CC may both be configured with the same TDD configuration, or with different TDD configurations. In general, each of subframes 0-9 that is labeled with a "D" or an "S" is a subframe with which UE 108 receives data from eNB 104, and each of subframes 0-9 that is labeled with a "U" is a subframe through which UE 108 transmits data to eNB 104.

eNB 104 may be configured to communicate some information solely by the PCell and be configured to communicate other information by either the PCell or the SCell. For example, eNB 104 may be configured to receive acknowledgment signals from UE 108 solely through the PCell. According one embodiment, the acknowledgment signals may be hybrid adaptive repeat and request (HARD) signals corresponding to a positive acknowledgment (ACK) of receipt of data and a negative acknowledgment (NACK) of receipt of data. In embodiments, UE 108 may be configured to transmit ACK/NACK signals to notify eNB 104 that transmitted data has or has not been received.

UE 108 may be configured to determine a schedule with which to transmit ACK/NACK signals to eNB 104. UE 108 may include a receiver module 144, a transmitter module 148, a processor module 152, and one or more suitable antennas 156. Receiver module 144 and transmitter module 148 may be coupled to one or more suitable antennas 156 to transmit and receive wireless signals to/from eNB 104.

Processor module 152 may be coupled to receiver module 144 and transmitter module 148 and be configured to decode and encode information transmitted in signals communicated between the UE 108 and the eNB 104. Processor module may include a communication module 154 and an HARQ module 158. Processor module 152 may be configured to use communication module 154 to transmit information in uplink subframes of the PCell, e.g., on CC_0, according to the scheduling of a first TDD configuration at a first frequency. Processor module 152 may also be configured to transmit information in uplink subframes of the SCell, e.g., on CC_1, according to a second TDD configuration at a second frequency that is different from the first frequency. According to one embodiment, the difference between transmission frequencies of CC_0 and CC_1 may range from hundreds of kilohertz to tens of Gigahertz, in accordance with inter-band carrier aggregation.

As will be described in more detail hereafter, processor module 152 may be configured to selectively transmit ACK/NACK information for SCell communications via a schedule of a TDD UL-DL configuration that is different than the TDD configuration of SCell. In embodiments, processor module 152 may use HARQ module 158 to select HARQ timing sequence or timing schedule based on one of the TDD configurations. HARQ module 158 may also generate the ACK/NACK information for processor module 152. The HARQ module may be coupled to the communication module 154 and may be configured to use the communication module 154 to transmit the generated ACK/NACK information via the selected HARQ timing sequence.

Various embodiments of the present disclosure may enable a eNB to schedule uplink and downlink data transmission with different TDD configurations on component carriers. These features may advantageously enable a communication system to transmit data information with higher peak data rates than previous communication systems. However, some information transmitted with a PCell and an SCell having different TDD configurations may result in HARQ ACK/NACK resources conflicts. For example, because HARQ ACK/NACK signals for both SCell and PCell may be transmitted between UE 108 and eNB 104 solely via uplink subframes of PCell, uplink subframe schedules of PCell may result in scheduling conflicts for ACK/NACK information for SCell.

While many embodiments described herein, are described in a carrier aggregation context, it will be understood that other embodiments may be applicable to an embodiment in which the UE 108 and eNB 104 utilize a single serving cell, with a single component carrier, for communications. In these embodiments, the UE 108 may be configured, e.g., by receipt of system information block 1 (SIB1) broadcast by the eNB 104, to communicate data with the eNB 104 according to a first TDD UL-DL configuration. The UE 108 may be further configured to transmit ACK/NACK information via a HARQ timing sequence of a second TDD UL-DL configuration. These and other embodiments will be described in further detail.

Figure 2:
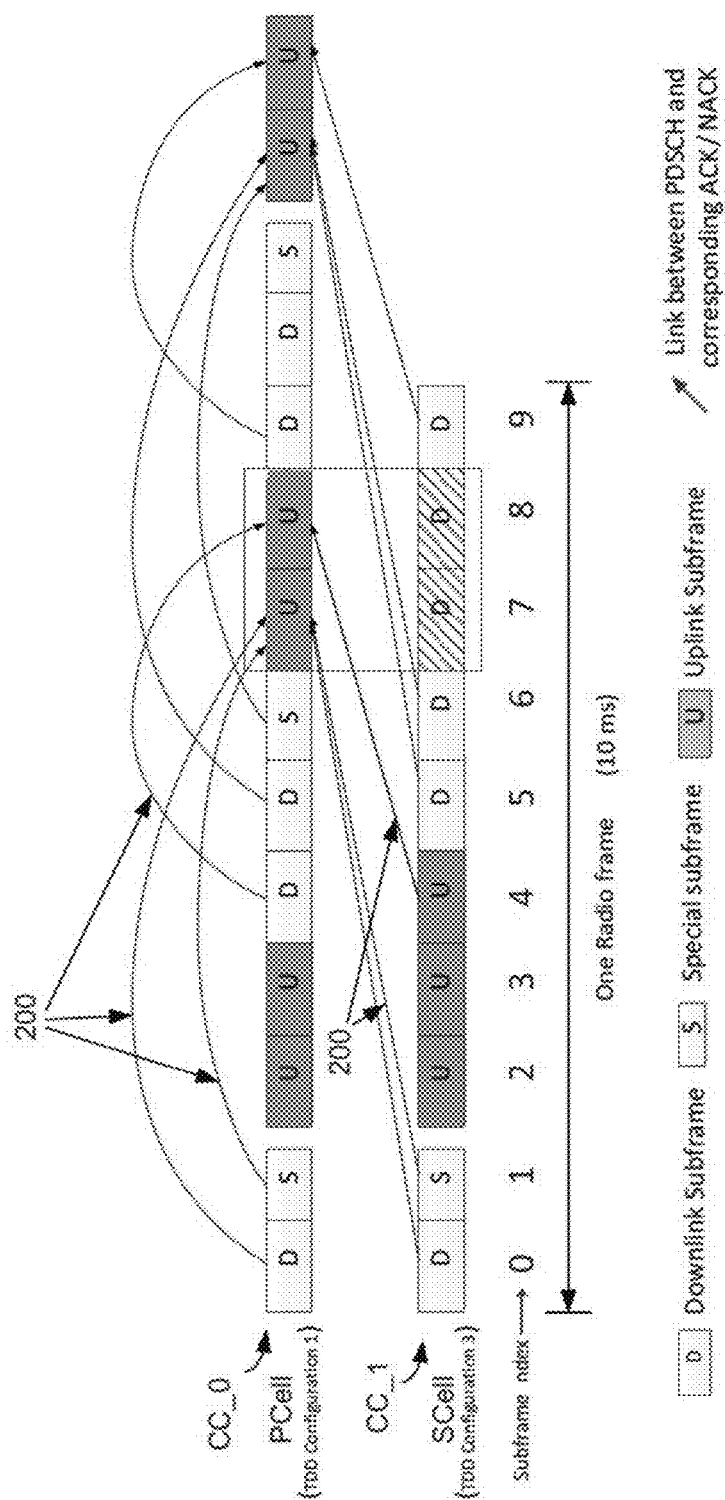
FIG. 2 schematically illustrates an optional HARQ signal scheduling diagram in accordance with various embodiments.

FIG. 2 illustrates a diagram of HARQ ACK/NACK signal scheduling that may be performed by processor module 152, according to embodiments. FIG. 2 shows PCell configured with TDD configuration 1 (shown in Table 1), and SCell configured with TDD configuration 3. Each of lines 200 represent a link between downlink or special subframe data and the uplink subframe that is designated to carry corresponding ACK/NACK information back to an eNB.

According to the solution of FIG. 2, PDSCH HARQ timing on all secondary serving cells (e.g., SCells) may follow the TDD UL-DL configuration of the PCell to allow increased reuse of Rel-10 TDD intra-band carrier aggregation design. For example, HARQ ACK/NACK information for SCell may be configured to follow the HARQ scheduling of TDD configuration 1 because TDD configuration 1 is the TDD configuration of PCell. However, such a configuration of SCell HARQ ACK/NACK information may result in some ACK/NACK information not being fed back to eNB.

As illustrated, subframes 7 and 8 of the SCell in one radio frame could not be scheduled and utilized by UEs using carrier aggregation with the shown TDD configuration because PCell does not have the corresponding resources for HARQ ACK/NACK transmission. Thus, while a solution that substantially reuses carrier aggregation design of release 10 may appear advantageous, such a solution also includes several weaknesses.

Figure 3:
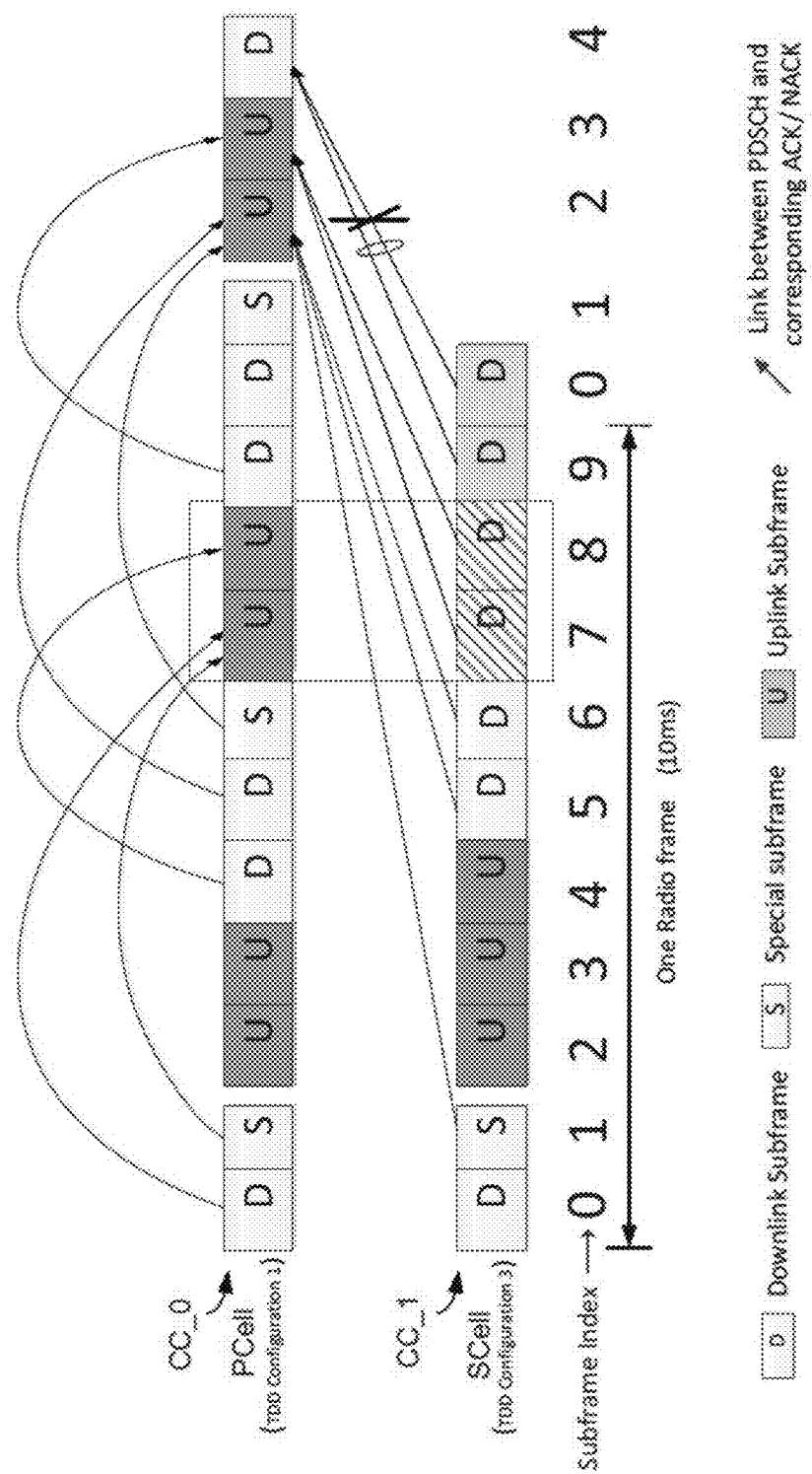
FIG. 3 schematically illustrates an optional HARQ signal scheduling diagram in accordance with various embodiments.

FIG. 3 illustrates a diagram of HARQ ACK/NACK signal scheduling that may be performed by processor module 152, according to embodiments. FIG. 3 illustrates an issue with merely scheduling the ACK/NACK information of SCell subframes 7 and 8 into PCell uplink subframe 3. As shown, ACK/NACK information of SCell subframes 9 and 0 may need to be transmitted during a downlink subframe of PCell subframe 4 rather than during a PCell uplink subframe. Thus, the solution illustrated by FIG. 3 may leave some ACK/NACK information without an uplink resource for transmission.

Figure 4:
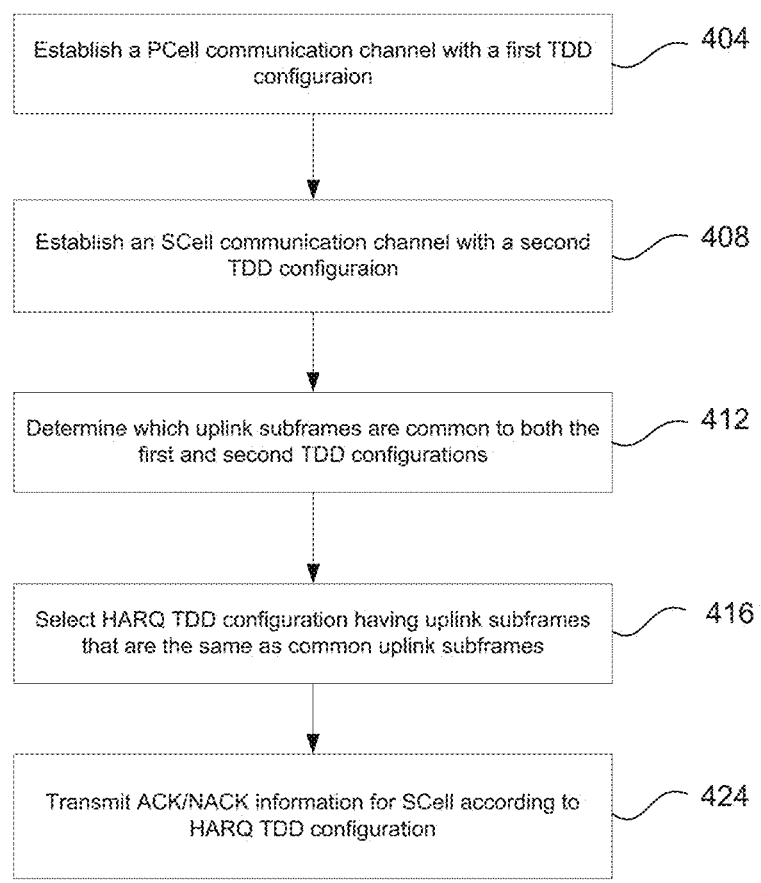
FIG. 4 is a flowchart illustrating selection of an HARQ signal scheduling configuration in accordance with various embodiments.

FIG. 4 is a flowchart illustrating a method 400 of selecting a HARQ scheduling configuration that may overcome the potential downsides illustrated in FIGS. 2 and 3, in accordance with various embodiments.

At block 404, UE 108 may establish a PCell with a first TDD configuration. In some embodiments, the UE 108 may establish the PCell with the first TDD configuration based on information received in an SIB1 broadcast from a base station, e.g., eNB 104.

At block 408, UE 108 may establish an SCell communication channel with a second TDD configuration. In some embodiments, the UE 108 may establish the SCell with the second TDD configuration based on information received, from the eNB 104, in radio resource control (RRC) signaling through the PCell.

At block 412, UE 108 may determine which uplink subframes are common to both the first and second TDD configurations. These may be referred to as the common UL subframes.

At block 416, UE 108 may select a reference TDD configuration having uplink subframes that are the same as the common UL subframes. For example, the uplink subframes of the selected HARQ TDD configuration may be the same as the common uplink subframes, no more and no less.

UE 108 may determine the reference TDD configuration based on information shown in Table 2. Table 2 (as shown in FIG. 11) shows an x-axis and a y-axis corresponding to TDD configurations 0-6 of the PCell and Scell, respectively. For example, if a PCell were configured with TDD configuration 4 and an SCell were configured with TDD configuration 2, UE 108 may select TDD configuration 5 as the reference TDD configuration.

The cross-hatched portions of Table 2 are instances in which the reference TDD configuration is neither the TDD configuration of the Pcell or the Scell.

The non-cross-hatched portions of Table 2 indicate a reference TDD configuration that is either the TDD configuration of the PCell or the TDD configuration of the SCell. The non-cross-hatched portions of Table 2 may be described in terms of downlink subframes of the TDD configurations for the PCell and SCell. In embodiments, the TDD configuration of the PCell is selected to be the reference TDD configuration if the set of downlink subframes indicated by the SCell TDD configuration (e.g., SIB1 configuration) is a subset of the downlink subframes indicated by the PCell TDD configuration (e.g., SIB1 configuration). The TDD configuration of the SCell is selected to be the reference TDD configuration if the set of downlink subframes indicated by the SCell TDD configuration is a superset of the downlink subframes indicated by the PCell TDD configuration.

Returning to FIG. 4, at block 424, UE 108 may transmit ACK/NACK information for the SCell according to the scheduling of the reference TDD configuration, e.g., TDD configuration 5.

Figure 5:
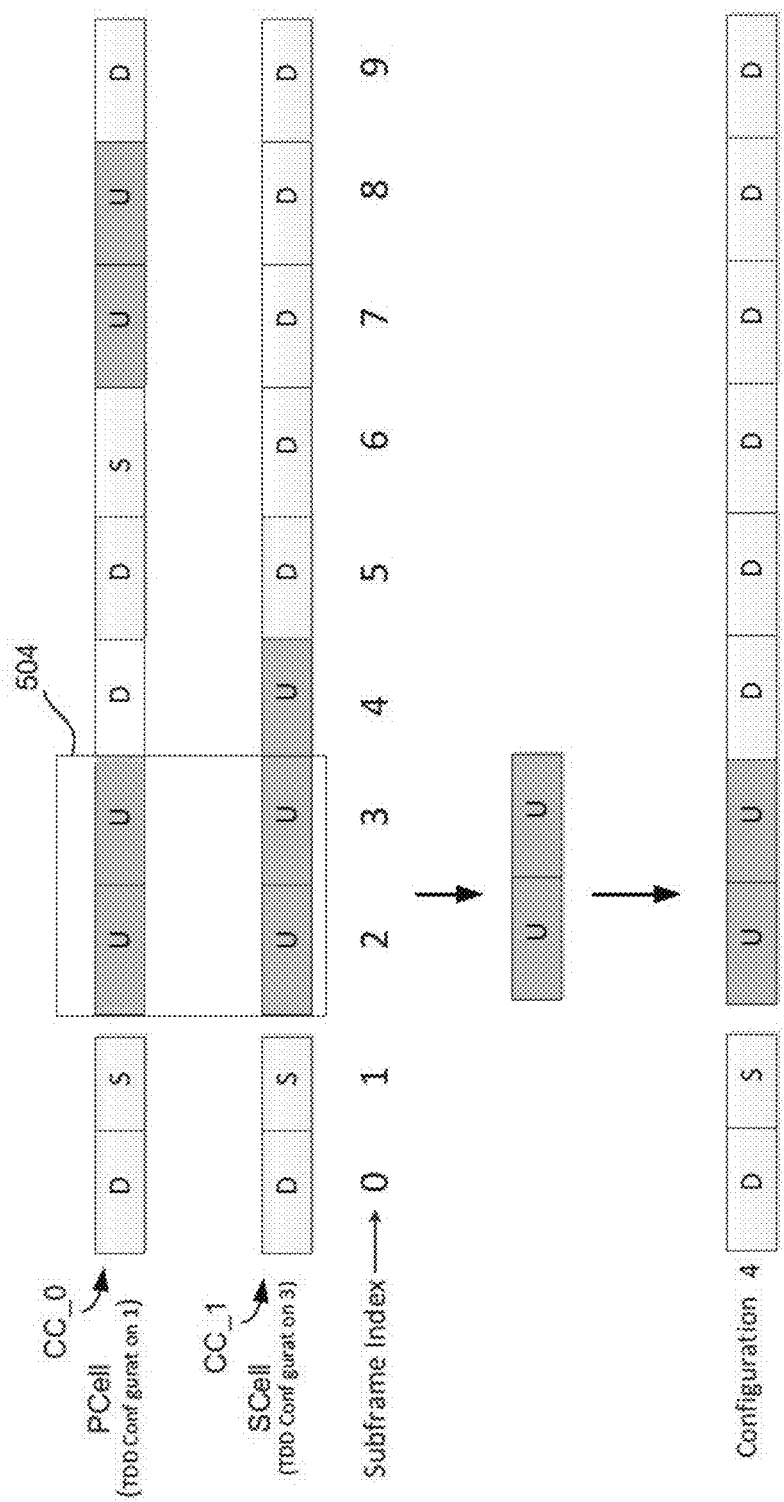
FIG. 5 schematically depicts an example of selecting a HARQ signal scheduling configuration in accordance with various embodiments.

FIG. 5 schematically depicts an example of selecting a reference TDD configuration in accordance with various embodiments. As described above in connection with method 400 and Table 2, box 504 encloses the uplink subframes (2 and 3) that are common between the TDD configuration of the PCell and the TDD configuration of the SCell. Of the TDD configurations of Table 1, TDD configuration 4 is the TDD configuration that includes uplink subframes 2 and 3. Additionally, Table 2 indicates that TDD configuration 4 may be used with a PCell TDD configuration 1 and an SCell TDD configuration 3. Therefore, TDD configuration 4 may be selected as the HARQ TDD configuration in this embodiment.

Figure 6:
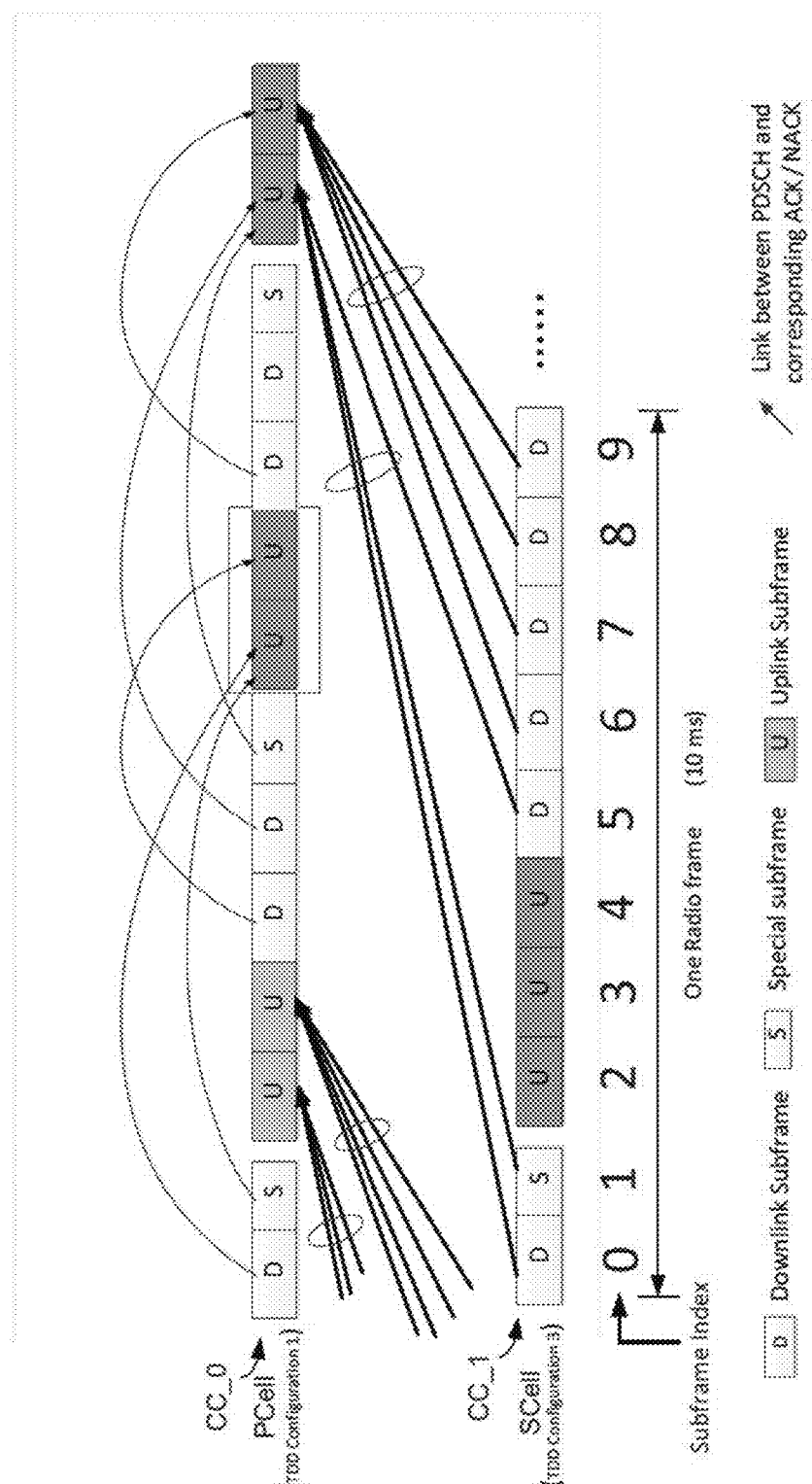
FIG. 6 schematically illustrates an example of HARQ signal scheduling in accordance with various embodiments.

FIG. 6 schematically illustrates an example of HARQ signal scheduling in accordance with various embodiments. In particular, FIG. 6 shows that HARQ ACK/NACK information related to SCell communications may be transmitted via PCell while the SCell and PCell are configured with different TDD configurations. As illustrated, SCell may be configured with TDD configuration 3, PCell may be configured with TDD configuration 1, and HARQ ACK/NACK information related to the SCell may be sent via PCell by using HARQ scheduling of TDD configuration 4.

Figure 7:
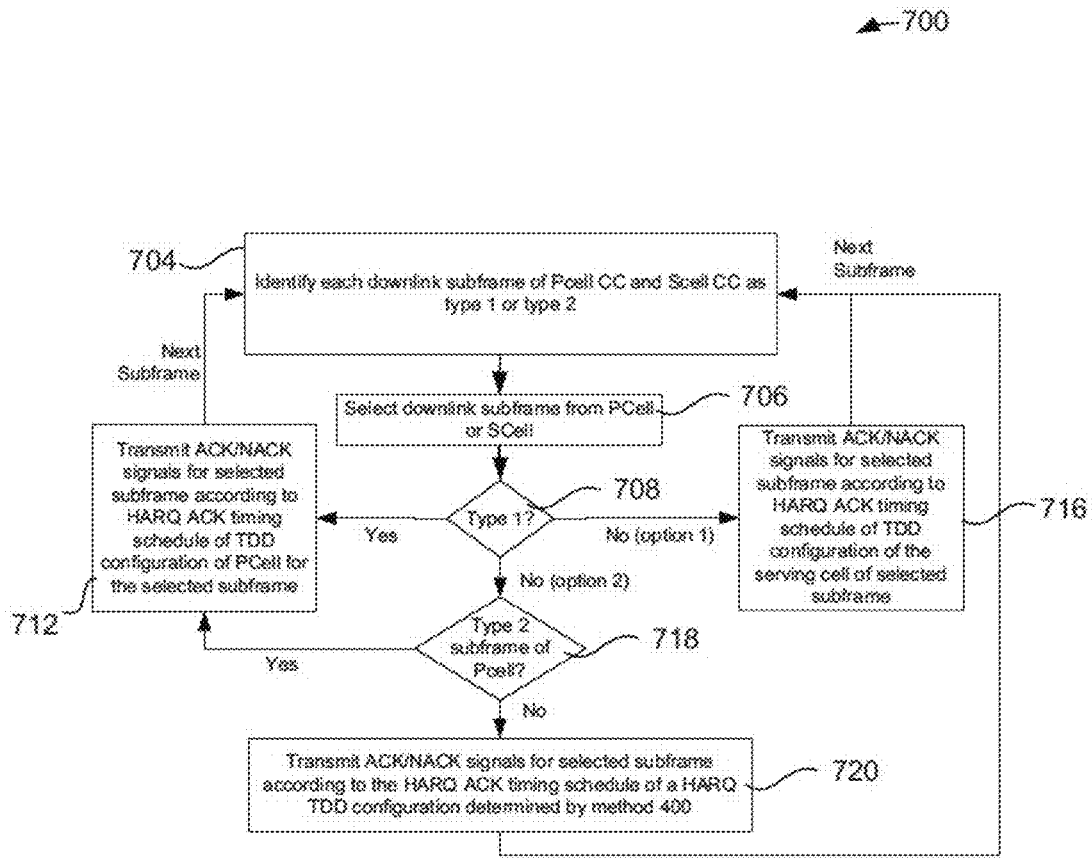
FIG. 7 is a flowchart illustrating selection of HARQ signal scheduling for downlink subframes in accordance with various embodiments.

FIG. 7 is a flowchart illustrating a method 700 of selecting a reference TDD configuration in accordance with various embodiments. UE 108 may execute method 700 as an alternative to or in combination with method 400, according to various embodiments.

At block 704, UE 108 may identify each downlink subframe of component carriers of both the PCell and the SCell as a type 1 subframe or a type 2 subframe. UE 108 may identify a downlink subframe as a type 1 subframe if a corresponding subframe in the other component carrier is also a downlink subframe. For example, a downlink subframe of subframe 6 in the PCell component carrier may be type 1 if subframe 6 of the SCell component carrier is also a downlink subframe. UE 108 may identify a downlink subframe as a type 2 subframe if a corresponding subframe in the other component carrier is an uplink subframe. For example, if subframe 3 of the SCell CC is a downlink subframe and subframe 3 of the PCell CC is an uplink subframe, then subframe 3 of the SCell CC may be a type 2 downlink subframe. In other words, each downlink subframe may be type 1 if the subframe is allocated similarly as a corresponding subframe of the other component carrier and may be type 2 if the subframe is allocated differently than a corresponding subframe of the other component carrier.

At block 706, UE 108 may select a downlink subframe from the PCell or the SCell.

At block 708, UE 108 may determine whether a downlink subframe is type 1. If the downlink subframe is type 1, then method 700 goes to block 712.

At block 712, UE 108 transmits ACK/NACK signals for the selected downlink subframe according to a timing schedule of the TDD configuration of the PCell. Method 700 then returns to block 704 for the next downlink subframe.

Returning to block 708, if the downlink subframe is not type 1, then method 700 goes to either block 716 (option 1) or block 718 (option 2).

At block 716, UE 108 transmits ACK/NACK signals for the downlink subframe according to a timing schedule of the TDD configuration of the serving cell in which the downlink subframe resides. For example, if the downlink subframe is type 2 in the PCell, then UE 108 transmits ACK/NACK signals for the downlink subframe according to the timing schedule of the TDD configuration of the PCell. If the downlink subframe is type 2 in the SCell, then UE 108 transmits ACK/NACK signals for the downlink subframe according to the timing schedule of the TDD configuration of the SCell. Method 700 then returns to block 704 for the next downlink subframe.

Returning to block 708, if the downlink subframe is not type 1, then method 700 may optionally go to block 718 instead of block 716.

At block 718, UE 108 may determine if the type 2 downlink subframe resides in the PCell. If the selected downlink subframe resides in the PCell, method 700 may go to block 712. If the selected downlink subframe resides in the SCell, method 700 may go to block 720.

At block 720, UE 108 may transmit ACK/NACK signals for selected subframe according to the HARQ-ACK timing schedule of a reference TDD configuration determined by method 400. Method 700 may then return to block 704.

Figure 8:
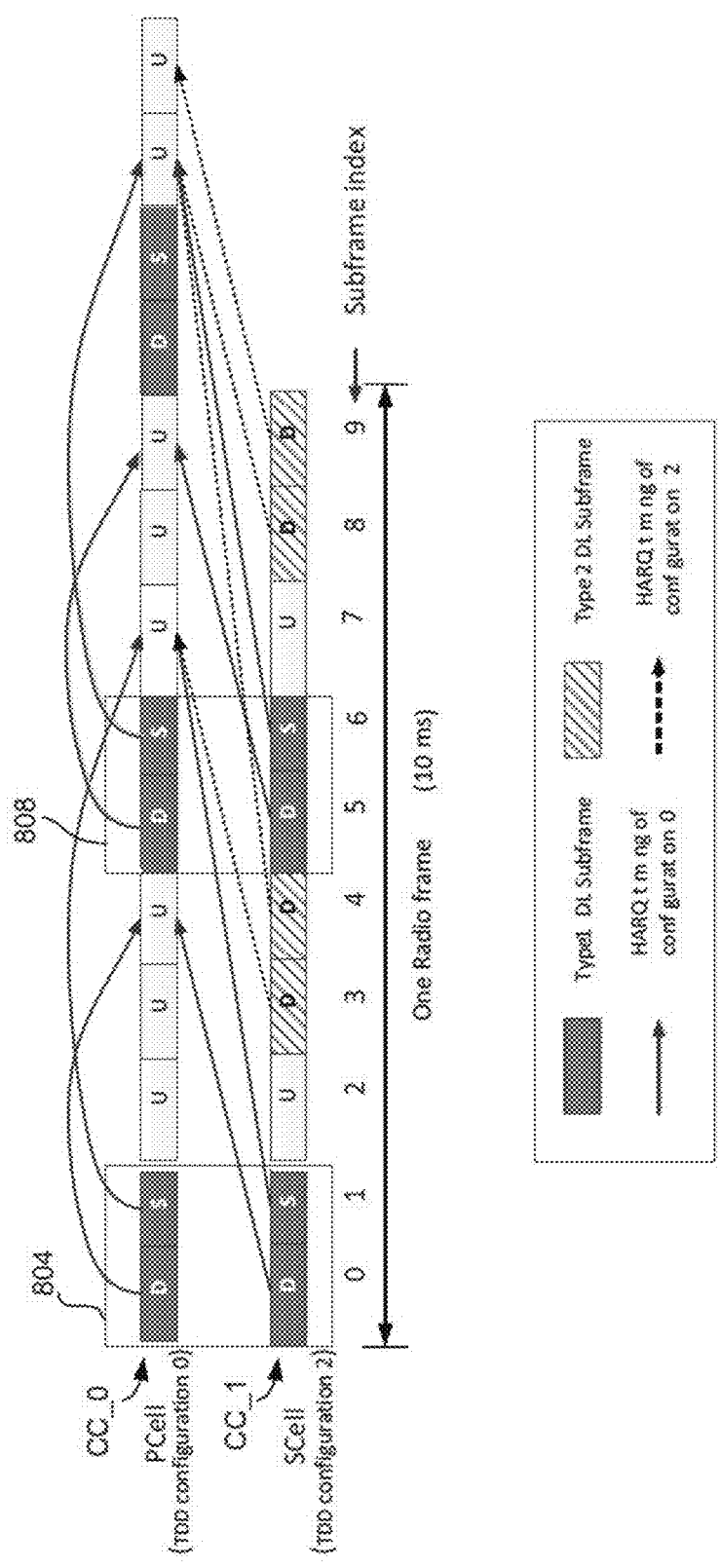
FIG. 8 schematically illustrates an example of an HARQ signal scheduling diagram in accordance with various embodiments.

FIG. 8 schematically illustrates an example of an HARQ signal scheduling diagram in accordance with various embodiments. For example, as discussed above in connection with method 700, downlink subframes (and special subframes) of the PCell and SCell may be identified as type 1, if the corresponding of the other serving cell are also downlink subframes. Box 804 and box 808 show that subframes 0, 1, 5, and 6 of both the PCell and SCell may be identified as type 1. Accordingly, the HARQ ACK/NACK information of the type 1 subframes may be transmitted according to the TDD configuration of the PCell, e.g., TDD configuration 0.

Downlink subframes of the PCell and the SCell may be identified as type 2, if the corresponding subframes of the other serving cell are uplink subframes. Subframes 3, 4, 8, and 9 of SCell include hash marks to indicate that they may be type 2 subframes. In accordance with method 700, the HARQ ACK/NACK information of the type 2 subframes of the SCell may be transmitted according to the HARQ timing of the TDD configuration of the SCell, e.g., TDD configuration 2. It may be noted that TDD configuration 2 would be selected either in option 1 or 2 of method 700 in this instance.

Figure 9:
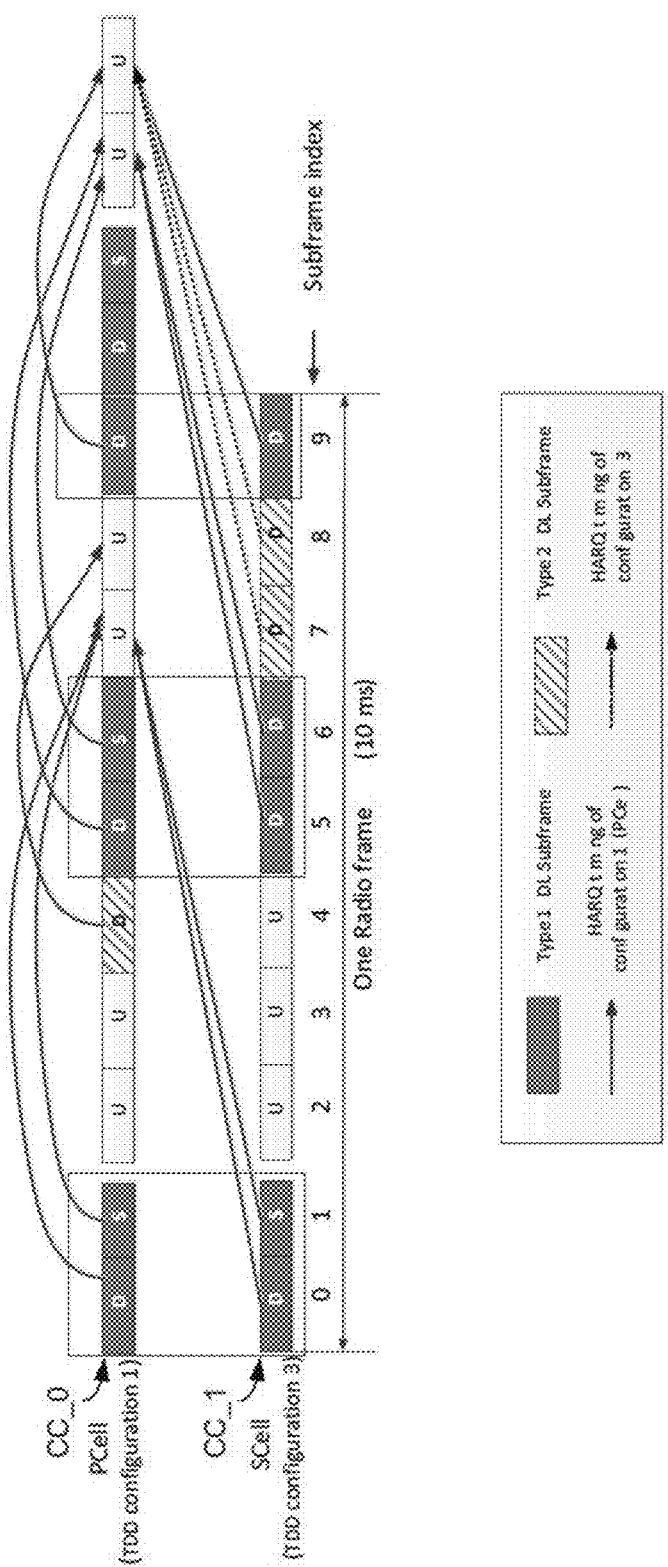
FIG. 9 schematically illustrates an example of an HARQ signal scheduling diagram in accordance with various embodiments.

FIG. 9 schematically illustrates an example of a HARQ signal scheduling diagram in accordance with various embodiments. According to one embodiment, downlink subframes may be identified as type 1 or type 2. In this embodiment, subframes 0, 1, 5, 6, and 9 of the PCell and the SCell may be type 1 subframes, while subframe 4 of the PCell and subframes 7 and 8 of the SCell may be type 2 subframes. As described in method 700, the HARQ timing of the TDD configuration of the PCell will be used for the type 1 subframes, whether they are in the PCell or the SCell.

With respect to the type 2 subframe of the PCell, i.e., subframe 4, the HARQ ACK/NACK information may be scheduled according to the TDD configuration of the PCell, e.g., TDD configuration 1. This may be the case with either option 1 or 2 of method 700.

With respect to the type 2 subframes of the SCell, i.e., subframes 7 and 8, the HARQ ACK/NACK information may be feedback according to the HARQ timing of TDD configuration 3, e.g., TDD configuration of the SCell, in the event option 1 of method 700 were used. However, if option 2 of method 700 were used, the HARQ ACK/NACK information may be scheduled according to a HARQ TDD configuration selected according to method 400. In this instance, the HARQ TDD configuration may be TDD configuration 4, given that the PCell has a TDD configuration 1 and SCell has a TDD configuration 3.

Figure 10:
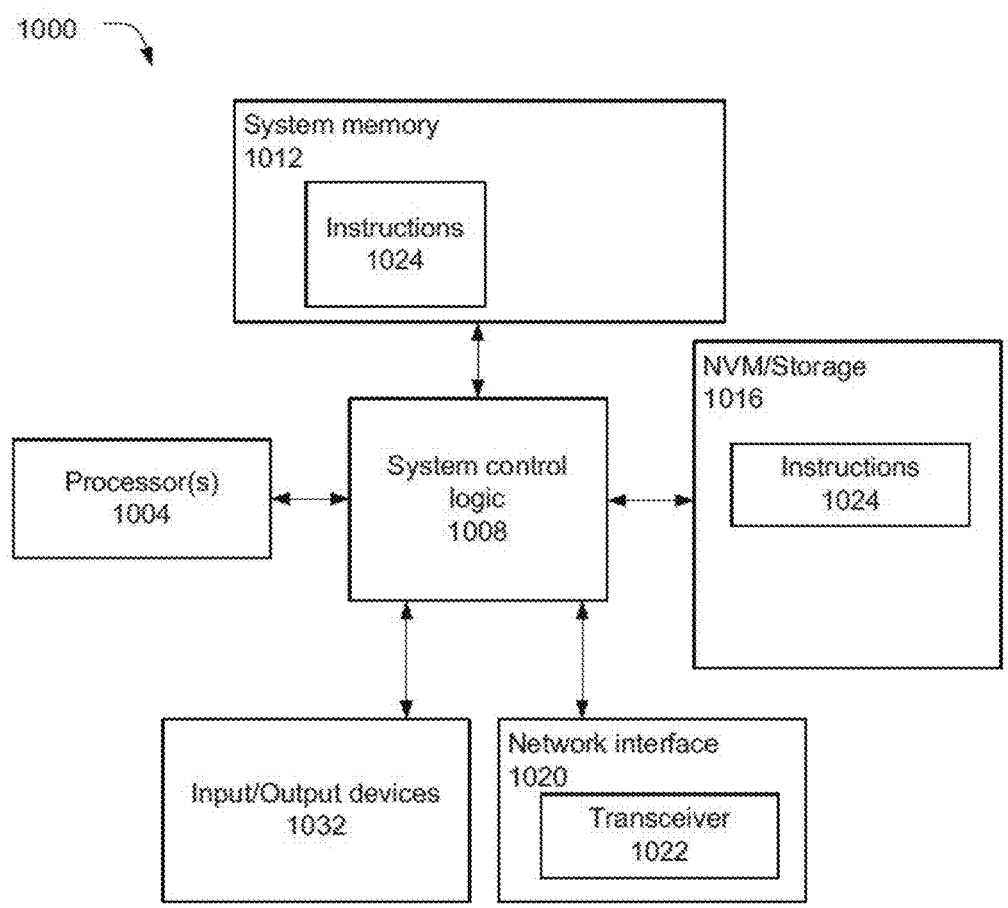
FIG. 10 schematically depicts an example system in accordance with various embodiments.

The eNB 104 and UE 108 described herein may be implemented into a system using any suitable hardware and/or software to configure as desired. FIG. 10 illustrates, for one embodiment, an example system 1000 comprising one or more processor(s) 1004, system control logic 1008 coupled with at least one of the processor(s) 1004, system memory 1012 coupled with system control logic 1008, non-volatile memory (NVM)/storage 1016 coupled with system control logic 1008, and a network interface 1020 coupled with system control logic 1008.

Processor(s) 1004 may include one or more single-core or multi-core processors. Processor(s) 1004 may include any combination of general-purpose processors and dedicated processors (e.g., graphics processors, application processors, baseband processors, etc.). In an embodiment in which the system 1000 implements UE 108, processors(s) 1004 may include processor module 152 and be configured to execute the embodiments of FIGS. 2-9 in accordance with various embodiments. In an embodiment in which the system 1000 implements eNB 104, processor(s) 1004 may include processor module 128 and be configured to decode the HARQ ACK/NACK information transmitted by UE 108.

System control logic 1008 for one embodiment may include any suitable interface controllers to provide for any suitable interface to at least one of the processor(s) 1004 and/or to any suitable device or component in communication with system control logic 1008.

System control logic 1008 for one embodiment may include one or more memory controller(s) to provide an interface to system memory 1012. System memory 1012 may be used to load and store data and/or instructions, for example, for system 1000. System memory 1012 for one embodiment may include any suitable volatile memory, such as suitable dynamic random access memory (DRAM), for example.

NVM/storage 1016 may include one or more tangible, non-transitory computer-readable media used to store data and/or instructions, for example. NVM/storage 1016 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 1016 may include a storage resource physically part of a device on which the system 1000 is installed or it may be accessible by, but not necessarily a part of, the device. For example, the NVM/storage 1016 may be accessed over a network via the network interface 1020.

System memory 1012 and NVM/storage 1016 may respectively include, in particular, temporal and persistent copies of instructions 1024. Instructions 1024 may include instructions that when executed by at least one of the processor(s) 1004 result in the system 1000 implementing a one or both of methods 400 and 700 as described herein. In some embodiments, instructions 1024, or hardware, firmware, and/or software components thereof, may additionally/alternatively be located in the system control logic 1008, the network interface 1020, and/or the processor(s) 1004.

Network interface 1020 may have a transceiver 1022 to provide a radio interface for system 1000 to communicate over one or more network(s) and/or with any other suitable device. The transceiver 1022 may be implement receiver module 144 and/or transmitter module 148. In various embodiments, the transceiver 1022 may be integrated with other components of system 1000. For example, the transceiver 1022 may include a processor of the processor(s) 1004, memory of the system memory 1012, and NVM/Storage of NVM/Storage 1016. Network interface 1020 may include any suitable hardware and/or firmware. Network interface 1020 may include a plurality of antennas to provide a multiple input, multiple output radio interface. Network interface 1020 for one embodiment may include, for example, a network adapter, a wireless network adapter, a telephone modem, and/or a wireless modem.

For one embodiment, at least one of the processor(s) 1004 may be packaged together with logic for one or more controller(s) of system control logic 1008. For one embodiment, at least one of the processor(s) 1004 may be packaged together with logic for one or more controllers of system control logic 1008 to form a System in Package (SiP). For one embodiment, at least one of the processor(s) 1004 may be integrated on the same die with logic for one or more controller(s) of system control logic 1008. For one embodiment, at least one of the processor(s) 1004 may be integrated on the same die with logic for one or more controller(s) of system control logic 1008 to form a System on Chip (SoC).

The system 1000 may further include input/output (I/O) devices 1032. The I/O devices 1032 may include user interfaces designed to enable user interaction with the system 1000, peripheral component interfaces designed to enable peripheral component interaction with the system 1000, and/or sensors designed to determine environmental conditions and/or location information related to the system 1000.

In various embodiments, the user interfaces could include, but are not limited to, a display (e.g., a liquid crystal display, a touch screen display, etc.), a speaker, a microphone, one or more cameras (e.g., a still camera and/or a video camera), a flashlight (e.g., a light emitting diode flash), and a keyboard.

In various embodiments, the peripheral component interfaces may include, but are not limited to, a non-volatile memory port, an audio jack, and a power supply interface.

In various embodiments, the sensors may include, but are not limited to, a gyro sensor, an accelerometer, a proximity sensor, an ambient light sensor, and a positioning unit. The positioning unit may also be part of, or interact with, the network interface 1020 to communicate with components of a positioning network, e.g., a global positioning system (GPS) satellite.

In various embodiments, the system 1000 may be a mobile computing device such as, but not limited to, a laptop computing device, a tablet computing device, a netbook, a mobile phone, etc. In various embodiments, system 1000 may have more or less components, and/or different architectures.

The disclosure may include various example embodiments disclosed below.

According to various example embodiments, a method may include establishing, by a mobile device, a primary serving cell (PCell) and a secondary serving (SCell) with a base station. The PCell may be established with a first TDD configuration, and the SCell may be established with a second TDD configuration. The method my include receiving, by the mobile device, downlink data through the SCell, and selecting, by the mobile device, a reference TDD configuration based on the first and second TDD configurations. The method may include transmitting acknowledgement information associated with the downlink data according to a hybrid automatic repeat request (HARD) timing of the reference TDD configuration.

In embodiments, the reference TDD configuration may be different from the TDD configuration indicated by a system information block of the SCell.

In embodiments, the system information block may be System Information Block 1 (SIB1).

In embodiments, the first TDD configuration may be indicated by SIB1 of PCell, and the second TDD configuration may be indicated by SIB1 of SCell.

In embodiments, the method may further include determining uplink subframes common between the first TDD configuration and the second TDD configuration, and selecting the reference TDD configuration based on the determined uplink subframes common between the first TDD configuration and the second TDD configuration.

In embodiments, selecting the reference TDD configuration may include identifying the uplink subframes common between the first TDD configuration and the second TDD configuration, and may include selecting the reference TDD configuration based on a determination that uplink subframes of the reference TDD configuration may be the same as the common uplink subframes between the first TDD configuration and the second configuration.

In embodiments, selecting the reference TDD configuration may include selecting the first TDD configuration as the reference TDD configuration if all downlink subframes of the second TDD configuration are a subset of all downlink subframes of the first TDD configuration, and may include selecting the second TDD configuration as the reference TDD configuration if all downlink subframes of the second TDD configuration are a superset of all downlink subframes of the first TDD configuration.

In embodiments, selecting the reference TDD configuration may include selecting TDD DL/UL configuration 4, if the first TDD configuration is TDD DL/UL configuration 1 and the second TDD configuration is TDD DL/UL configuration 3; selecting TDD DL/UL configuration 5, if the first TDD configuration is TDD DL/UL configuration 2 and the second TDD configuration is TDD DL/UL configuration 3; and selecting TDD DL/UL configuration 5, if the first TDD configuration is TDD DL/UL configuration 2 and the second TDD configuration is TDD DL/UL configuration 4.

In embodiments, selecting the acknowledgment TDD may include selecting TDD DL/UL configuration 4, if the first TDD configuration is TDD DL/UL configuration 3 and the second TDD configuration is TDD DL/UL configuration 1; selecting TDD DL/UL configuration 5, if the first TDD configuration is TDD DL/UL configuration 3 and the second TDD configuration is TDD DL/UL configuration 2; and selecting TDD DL/UL configuration 5, if the first TDD configuration is TDD DL/UL configuration 4 and the second TDD configuration is TDD DL/UL configuration 2.

In embodiments, acknowledgement information may include hybrid automatic repeat request acknowledgement (HARQ-ACK) signals, and only HARQ-ACK signals associated with the downlink data of the SCell may be transmitted according to the HARQ timing of the reference TDD configuration. HARQ-ACK signals associated with downlink data of the PCell may be transmitted only according to the HARQ timing of the first TDD configuration.

In embodiments, transmitting the acknowledgement information may include transmitting a positive or negative acknowledgement according to the HARQ timing of the reference TDD configuration through at least one uplink subframe.

In embodiments, each of the first, second, and reference TDD configurations may include at least one of TDD downlink/uplink (DL/UL) configurations 0-6 associated with release 8 of 3rd Generation Partnership Project's long term evolution (LTE) advanced wireless communication standard.

According to various example embodiments, a method may include communicating, by a mobile device, with a base station via first and second component carriers having different frequency bands and time division duplexing (TDD) configurations. The method may include receiving one or more downlink transmissions via the second component carrier, and selecting a hybrid automatic repeat request (HARQ) timing sequence based on the TDD configurations of the first and second component carriers. The method may include transmitting one or more positive acknowledgment and/or negative acknowledgement (ACK/NACK) signals, associated with the one or more downlink transmissions, according to the selected HARQ timing sequence.

In embodiments, selecting the HARQ timing sequence may include identifying, by the mobile device, each downlink subframe of the first and second component carriers as either a first type of downlink subframe or a second type of downlink subframe. Each downlink subframe of one of the first and second component carriers may be the first type if a corresponding subframe of the other of the first and second component carriers is also a downlink subframe. Each downlink subframe of the one of the first and second component carriers may be the second type if a corresponding subframe of the other of the first and second component carriers is an uplink subframe. Selecting the HARQ timing sequence may also include selectively transmitting, by the mobile device, the one or more ACK/NACK signals associated with each downlink subframe based on whether the downlink subframe is identified as the first type of downlink subframe or the second type of downlink subframe.

In embodiments, selectively transmitting the one or more ACK/NACK signals may include transmitting the one or more ACK/NACK signals according to the TDD configuration of the first component carrier for each downlink subframe identified as the first type of downlink subframe.

In embodiments, selectively transmitting the one or more ACK/NACK signals may include transmitting the one or more ACK/NACK signals according to the TDD configuration of the second component carrier for each downlink subframe of the second component carrier identified as the second type of downlink subframe and transmitting the one or more ACK/NACK signals according to the TDD configuration of the first component carrier for each downlink subframe of the first component carrier identified as the second type of downlink subframe.

In embodiments, selectively transmitting the one or more ACK/NACK signals may include transmitting the one or more ACK/NACK signals according to a reference TDD configuration for each downlink subframe of the second component carrier identified as the second type and transmitting the one or more ACK/NACK signals according to the TDD configuration of the first component carrier for each downlink subframe of the first component carrier identified as the second type.

In embodiments, the reference TDD configuration may be selected to contain uplink subframes that are the same as subframes that are common to TDD configurations of both the first and second component carriers.

In embodiments, each of the TDD configurations may include one of configurations 0-6 associated with release 8 of 3rd Generation Partnership Project's (3GPP) long term evolution (LTE) advanced wireless communication standard.

In embodiments, the mobile device may be a mobile phone, a netbook, a laptop, an electronic tablet, or a data system of a vehicle.

According to various example embodiments, at least one machine readable medium may include a number of instructions that, in response to being executed on a computing device, cause the computing device to carry out any of the example embodiments of disclosed methods.

According to various example embodiments, an apparatus may include a communication module configured to communicate with a base station via first and second component carriers having different frequency bands and time division duplexing (TDD) configurations. The communication module may be configured to receive one or more downlink transmissions via the second component carrier. The apparatus may include a hybrid automatic repeat request (HARQ) module coupled with the communication module and configured to select a HARQ timing sequence based on the TDD configurations of the first and second component carriers. The HARQ module may be configured to generate one or more positive acknowledgment and/or negative acknowledgement (ACK/NACK) signals, associated with the one or more downlink transmissions. The communication module may be further configured to transmit the one or more ACK/NACK signals according to the selected HARQ timing sequence.

In embodiments, the HARQ module may be further configured to identify uplink subframes common between the TDD configurations of the first and second component carriers. The selected HARQ timing sequence may be a HARQ timing sequence of a reference TDD configuration having the same uplink subframes as the identified common uplink subframes.

In embodiments, Each of the TDD configurations may include one of TDD configurations 0-6 associated with release 8 of 3rd Generation Partnership Project's long term evolution (LTE) advanced wireless communication standard.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. An apparatus comprising:
means to receive, through a secondary serving cell (SCell), a downlink data that has a second time division duplex (TDD) configuration;
means to identify a reference TDD configuration based on a first TDD configuration of a primary serving cell (PCell) and the second TDD configuration; and
means to transmit, via a communication module, acknowledgement information associated with downlink data received through the SCell according to a hybrid automatic repeat request (HARQ) timing of the reference TDD configuration, wherein:
the acknowledgement information includes HARQ-acknowledgement (HARQ-ACK) signals;
only HARQ-ACK signals associated with the downlink data of the SCell are to be transmitted according to the HARQ timing of the reference TDD configuration; and
HARQ-ACK signals associated with downlink data of the PCell are to be transmitted only according to the HARQ timing of the first TDD configuration.

2. The apparatus of claim 1, wherein the reference TDD configuration is different from the TDD configuration indicated by a system information block of the SCell.

3. The apparatus of claim 2, wherein the system information block is System Information Block 1 (SIB1).

4. The apparatus of claim 1, wherein:
the first TDD configuration is indicated by system information block (SIB1) of the PCell; and
the second TDD configuration is indicated by SIB1 of the SCell.

5. The apparatus of claim 1, further comprising:
means to identify uplink subframes common between the first TDD configuration and the second TDD configuration; and
means to identify the reference TDD configuration based on the determined uplink subframes common between the first TDD configuration and the second TDD configuration.

6. The apparatus of claim 5, wherein the means to identify the reference TDD configuration include:
means to identify the uplink subframes common between the first TDD configuration and the second TDD configuration; and
means to identify the reference TDD configuration based on a determination that uplink subframes of the reference TDD configuration are the same as the common uplink subframes between the first TDD configuration and the second TDD configuration.

7. The apparatus of claim 1, wherein the means to identify the reference TDD configuration include:
means to identify the first TDD configuration as the reference TDD configuration if downlink subframes of the second TDD configuration are a subset of downlink subframes of the first TDD configuration; and
means to identify the second TDD configuration as the reference TDD configuration if downlink subframes of the second TDD configuration are a superset of downlink subframes of the first TDD configuration.

8. The apparatus of claim 1, wherein the means to identify the reference TDD configuration include:
means to identify TDD downlink/uplink configuration 4, if the first TDD configuration is TDD DL/UL configuration 1 and the second TDD configuration is TDD DL/UL configuration 3;
means to identify TDD DL/UL configuration 5, if the first TDD configuration is TDD DL/UL configuration 2 and the second TDD configuration is TDD DL/UL configuration 3; and
means to identify TDD DL/UL configuration 5, if the first TDD configuration is TDD DL/UL configuration 2 and the second TDD configuration is TDD DL/UL configuration 4.

9. The apparatus of claim 1, wherein the means to identify the reference TDD configuration include:
means to identify TDD DL/UL configuration 4, if the first TDD configuration is TDD DL/UL configuration 3 and the second TDD configuration is TDD DL/UL configuration 1;
means to identify TDD DL/UL configuration 5, if the first TDD configuration is TDD DL/UL configuration 3 and the second TDD configuration is TDD DL/UL configuration 2; and
means to identify TDD DL/UL configuration 5, if the first TDD configuration is TDD DL/UL configuration 4 and the second TDD configuration is TDD DL/UL configuration 2.

10. The apparatus of claim 1, further comprising:
means to transmit a positive or negative acknowledgement according to the HARQ timing of the reference TDD configuration through at least one uplink subframe.

11. An apparatus comprising:
a hybrid automatic repeat request (HARQ) module to identify a reference TDD configuration based on a first TDD configuration of a primary serving cell (PCell) and a second TDD configuration of a downlink data received through a secondary serving cell (SCell); and
a communication module coupled with the HARQ module, the communication module to transmit acknowledgement information associated with downlink data received through the SCell according to a HARQ timing of the reference TDD configuration, wherein:
the acknowledgement information includes HARQ-acknowledgement (HARQ-ACK) signals;
only HARQ-ACK signals associated with the downlink data of the SCell are to be transmitted according to the HARQ timing of the reference TDD configuration; and
HARQ-ACK signals associated with downlink data of the PCell are to be transmitted only according to the HARQ timing of the first TDD configuration.

12. The apparatus of claim 11, wherein the reference TDD configuration is different from the TDD configuration indicated by a system information block of the SCell.

13. The apparatus of claim 12, wherein the system information block is System Information Block 1 (SIB1).

14. The apparatus of claim 11, wherein:
the first TDD configuration is indicated by system information block (SIB1) of the PCell; and
the second TDD configuration is indicated by SIB1 of the SCell.

15. The apparatus of claim 11, wherein the HARQ module is further to:
identify uplink subframes common between the first TDD configuration and the second TDD configuration; and
identify the reference TDD configuration based on the determined uplink subframes common between the first TDD configuration and the second TDD configuration.

16. The apparatus of claim 15, wherein the HARQ module is further to:
identify the uplink subframes common between the first TDD configuration and the second TDD configuration; and
identify the reference TDD configuration based on a determination that uplink subframes of the reference TDD configuration are the same as the common uplink subframes between the first TDD configuration and the second TDD configuration.

17. The apparatus of claim 11, wherein the HARQ module is further to:
identify the first TDD configuration as the reference TDD configuration if downlink subframes of the second TDD configuration are a subset of downlink subframes of the first TDD configuration; and
identify the second TDD configuration as the reference TDD configuration if downlink subframes of the second TDD configuration are a superset of downlink subframes of the first TDD configuration.

18. The apparatus of claim 11, wherein the HARQ module is further to:
identify TDD downlink/uplink configuration 4, if the first TDD configuration is TDD DL/UL configuration 1 and the second TDD configuration is TDD DL/UL configuration 3;
identify TDD DL/UL configuration 5, if the first TDD configuration is TDD DL/UL configuration 2 and the second TDD configuration is TDD DL/UL configuration 3; and
identify TDD DL/UL configuration 5, if the first TDD configuration is TDD DL/UL configuration 2 and the second TDD configuration is TDD DL/UL configuration 4.

19. The apparatus of claim 11, wherein the HARQ module is further to:
identify TDD DL/UL configuration 4, if the first TDD configuration is TDD DL/UL configuration 3 and the second TDD configuration is TDD DL/UL configuration 1;
identify TDD DL/UL configuration 5, if the first TDD configuration is TDD DL/UL configuration 3 and the second TDD configuration is TDD DL/UL configuration 2; and
identify TDD DL/UL configuration 5, if the first TDD configuration is TDD DL/UL configuration 4 and the second TDD configuration is TDD DL/UL configuration 2.

20. The apparatus of claim 11, wherein the communication module is further to transmit a positive or negative acknowledgement according to the HARQ timing of the reference TDD configuration through at least one uplink subframe.

* * * * *